April 30, 1968    H. BRICKMAN ET AL    3,381,119
ILLUMINATED PORTABLE VANITY CASE
Filed Oct. 22, 1965    2 Sheets-Sheet 1
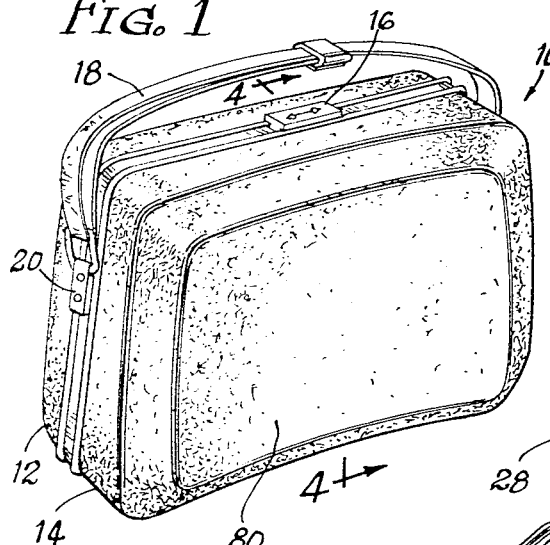
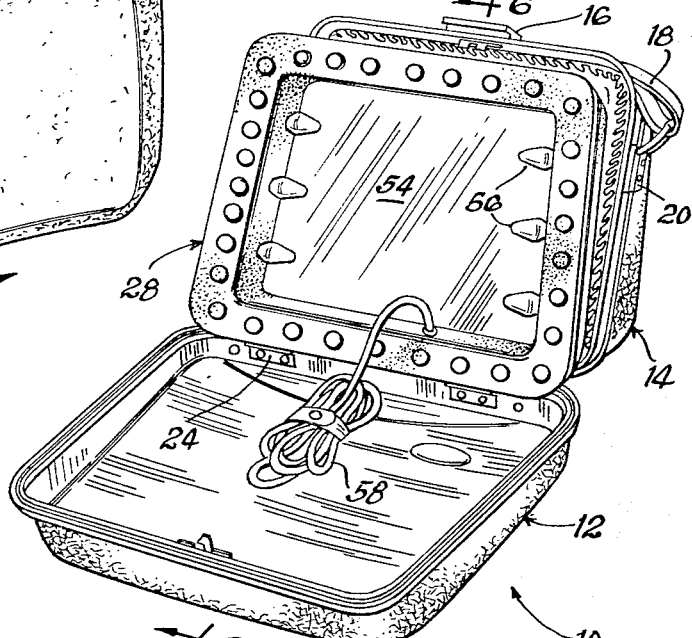
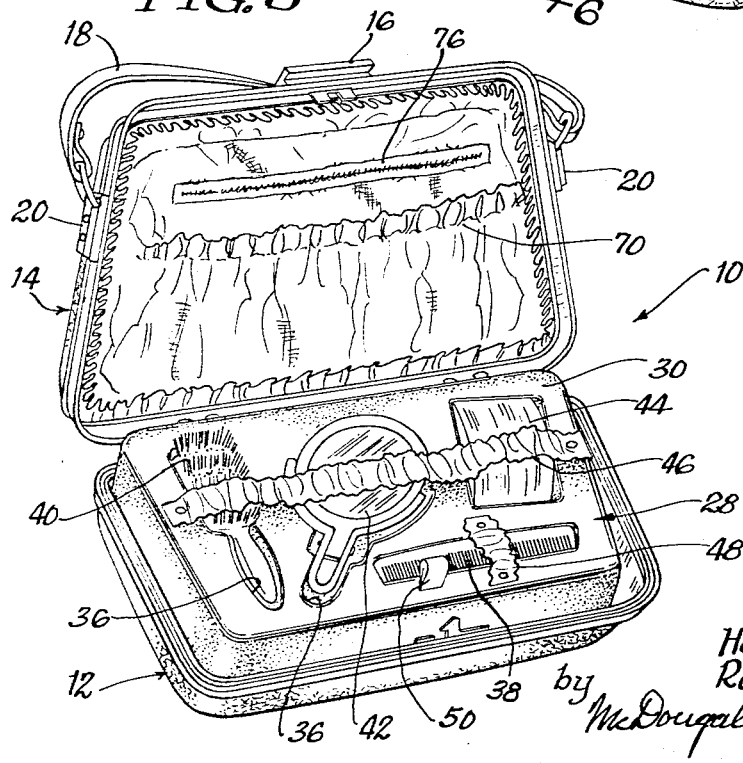
INVENTORS
Harold Brickman
Robert Deschamps
by McDougall, Hersh & Scott
Attys

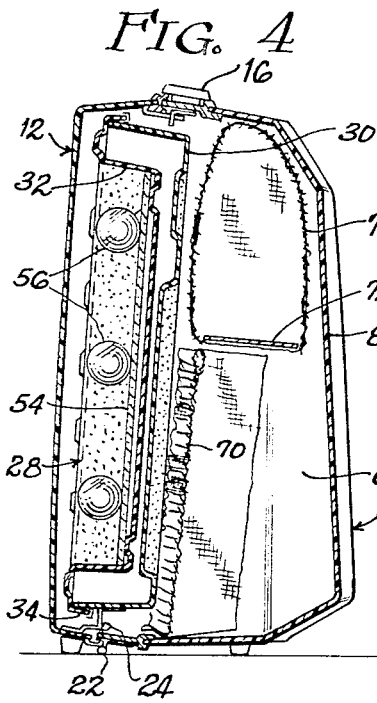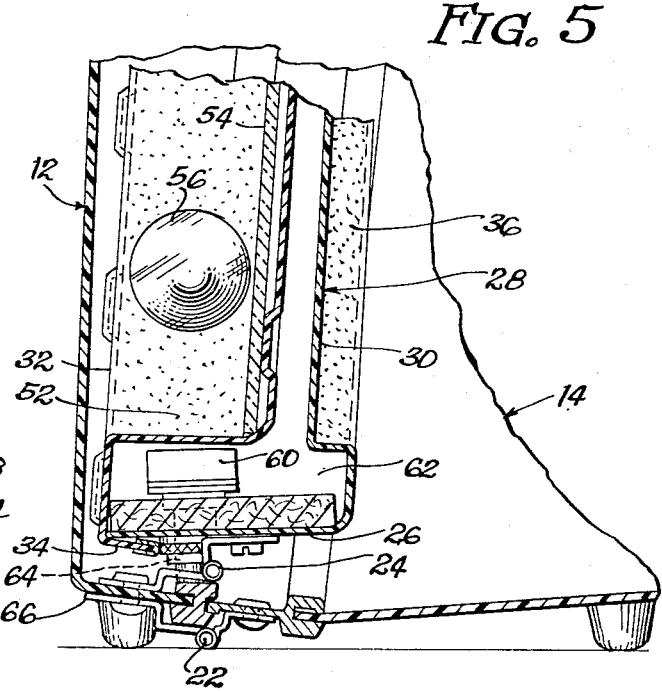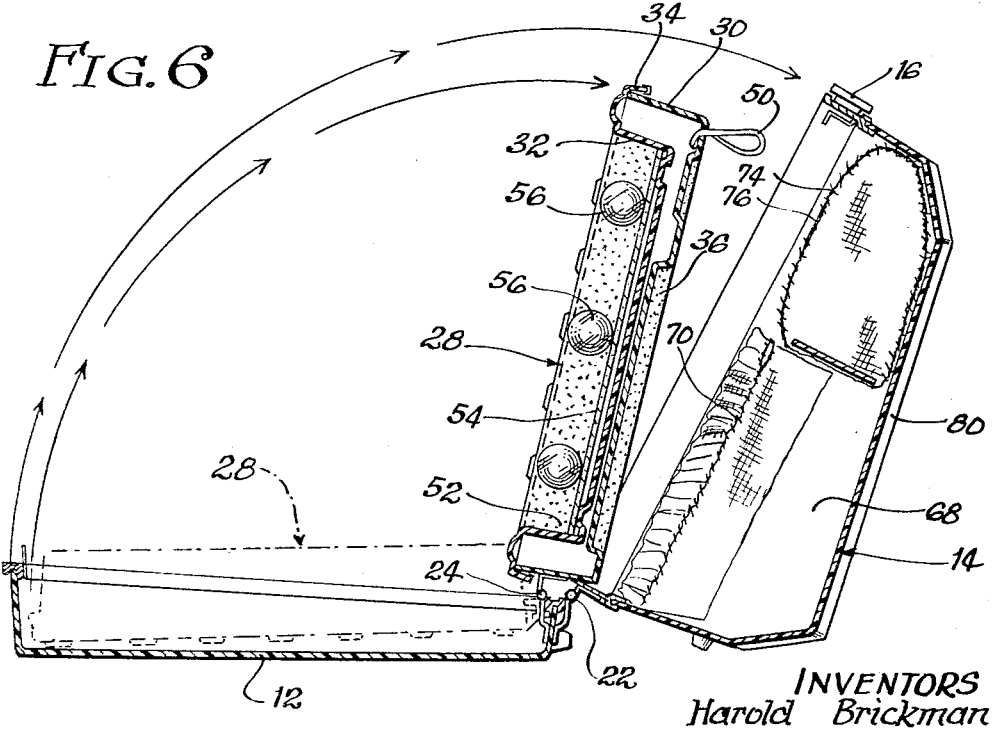

United States Patent Office 3,381,119
Patented Apr. 30, 1968

3,381,119
ILLUMINATED PORTABLE VANITY CASE
Harold Brickman, Chicago, and Robert Deschamps, Lombard, Ill., assignors to Ever-Wear, Inc., Chicago, Ill., a corporation of Illinois
Filed Oct. 22, 1965, Ser. No. 501,807
10 Claims. (Cl. 240—4.2)

ABSTRACT OF THE DISCLOSURE

A vanity case construction comprising first and second sections which define hollow interiors and which are hinged together so that the sections can be closed around adjoining edges. A third section is hinged relative to the other sections and it is disposed intermediate these sections so that the third section will be received within the hollow interiors when the outer sections are closed. A mirror is secured on one side of the third section, and lights are peripherally arranged around the mirror. Electrical connections are provided whereby the lights will operate when the mirror is in an operative position.

---

This invention relates to a portable case construction. The invention is particularly concerned with a case construction which is uniquely suitable for use as a vanity or overnight case. Thus, the features of the case construction adapt the construction for carrying of various articles and also provide a highly suitable arrangement for incorporating a mirror and other elements in the case.

It is a general object of this invention to provide an improved case construction.

It is a more particular object of this invention to provide a case construction which is adapted to be used as a vanity case.

It is a further object of this invention to provide a vanity case which is characterized by portability where the case can be used for trips and the like.

It is a still further object of this invention to provide a case of the type described which includes a mirror as well as portions enabling the inclusion of various articles such as comb and brush sets within the case, which is characterized by lighting means for maximum effective use of the case, and which provides these various elements in an extremely compact fashion whereby additional space is provided for carrying other articles without requiring an unduly large construction.

These and other objects of this invention will appear hereinafter and for purposes of illustration but not of limitation, specific embodiments of the invention are shown in the accompanying drawings in which:

FIGURE 1 is a perspective view illustrating the exterior of the case;

FIGURE 2 is a perspective view illustrating the case in one open position of use;

FIGURE 3 is a perspective view illustrating the case in an alternative open position of use;

FIGURE 4 is a vertical cross-sectional view taken about the line 4—4 of FIGURE 1;

FIGURE 5 is an enlarged detail sectional view illustrating the hinge connections and switching means for the case; and, FIGURE 6 is a cross-sectional view of the case in its open position taken about the line 6—6 of FIGURE 2.

The case construction of this invention comprises first and second sections with each of these sections defining a hollow interior. Hinge means interconnect the respective sections whereby the sections are adapted to be closed. In this respect, therefore, the case construction is similar to a brief case or suitcase arrangement. Thus, the hollow interior portions of the respective sections provide room for the holding of articles.

The case construction also includes a third section comprising an interior member. This third section is attached to one of the other sections by hinge means. The third section is of a size substantially coextensive with the other sections, and it is adapted to be seated in position with respect to either of these sections. When the case is open, either surface of the interior member is exposed for use depending on the location of the interior member with respect to the other sections.

As indicated, the construction of this invention is particularly suitable for use as a vanity case. The interior member comprising the third section is provided with recesses for holding various accessories. The opposite surface of the construction carries a mirror, and a particularly important aspect of the invention involves the provision of lights in association with this mirror. Switch means are provided whereby these lights will operate only when the case is in a particular open position.

The accompanying drawings illustrate a case 10 which is characterized by the features of this invention. The case includes outer sections 12 and 14, and these sections are adapted to be closed as illustrated in FIGURE 1. Suitable latch means 16 are provided for locking the construction, and a strap 18 is secured at points 20 along the sides of the case whereby the case can be carried with ease. It will be appreciated that a wide variety of latch means and handle means can be associated with a construction of the type illustrated.

The sections 12 and 14 are secured together by means of hinges 22. A second hinge 24 is secured at one end to the section 12 while the other end of the hinge is attached to the wall 26 of a third interior section 28.

The interior section 28 is formed of a pair of members 30 and 32. The member 32 defines a flange 34 which is adapted to fit over the rim of the member 30. A relatively tight fitting arrangement is desired whereby these members will be clamped in place with respect to each other. Other arrangements can be employed for providing the section 28; however, the illustrated arrangement is preferred since the respective members 30 and 32 can be readily molded of a composition material and assembled with similar ease.

The member 30 of the section 28 defines recesses 36 on its exposed surface. As shown in FIGURE 3, articles such as a comb 38, brush 40, hand mirror 42, and container 44 can be readily fitted into these recesses. Band members 46 and 48, preferably including resilient material, extend over the recesses to secure the various articles in place. A tab member 50 extends upwardly from the surface of the member 30 whereby the member can be easily raised when located in position within the section 12 of the case.

The member 32 of the section 28 defines a large recessed portion 52 and a mirror 54 is located within this recessed portion. Light bulbs 56 extend outwardly from the side walls of the recessed portion 52 whereby light is provided when an individual is using the mirror 54.

It will be noted that the mirror 54 is utilized when the interior section 28 is located in the position shown in FIGURE 2. A cord 58 is provided whereby the lights 56 can be turned on by using a suitable electrical outlet.

A switch 60 is located within a hollow interior portion 62 formed by the respective members 30 and 32. The switch 60 is included in the line which includes the cord 58 and the lights 56. An actuating member 64 of the switch extends downwardly through the wall 26 of the section 28. This actuating member is preferably of the type comprising a resilient element which normally holds the actuating member in an outward position. In this condition of the switch, a circuit can be completed to the lights 56 through the cord 58.

When the case is closed as shown in FIGURE 5, the actuating member 64 is pressed against a surface adjacent the bottom wall 66 of the case. This surface may be formed by a special member attached to the bottom wall for association with the switch. On the other hand, the actuating member may simply be pressed against the wall of the case. In any event, this action will open the switch whereby a circuit cannot be completed to the lights. Naturally, the lights will, therefore, not work when the case is closed even if the plug at the end of the cord 58 still remained in a socket. This arrangement provides particular advantages when the case is formed of plastic, since the heat from the light would deform the plastic if the light were left on for an extended period with the case closed.

The switch member 60 and its actuating member 64 also operate to prevent light operation under certain conditions when the case is open. This is illustrated in dotted lines in FIGURE 6 wherein the interior section 28 is received within the section 12. In this instance, the actuating member 64 will be pressed against the adjacent case surface whereby the lights will not operate. This is, of course, an extremely desirable arrangement since as shown in FIGURE 3, the mirror 54 is hidden in this condition of the section 28. Obviously, the lights will then operate only when the mirror is in an operable position as shown in FIGURES 2 and 6.

It will be noted that the arrangement illustrated provides substantial room in the section 14 in the case. This section is preferably employed for holding additional articles whereby the case can serve as an overnight case in addition to its use as a vanity case. A pocket 68 is provided by means of a fabric 70 which extends across the section 14. A ledge 72 may also be located in this section, and a removable bag 74 having a zipper 76 associated therewith is adapted to rest on this ledge. Obviously a variety of arrangements can be made for utilizing this additional space. The arrangement of this invention is particularly desirable, however, because the variety of elements incorporated in the construction are all arranged in a highly compact fashion thereby leaving room for other articles.

The shape of the case is also selected to provide advantages for the user. Thus, the side wall 80 (FIGURE 1) is curved whereby the case will conform to the side of an individual using the case. In this connection, the strap 18 may be used as a shoulder strap.

It will be understood that various changes and modifications may be made in the above described construction which provide the characteristics of this invention without departing from the spirit thereof particularly as defined in the following claims.

That which is claimed is:

1. A vanity case contruction comprising first and second sections, each of said sections defining a hollow interior, hinge means interconnecting said sections along respective adjoining edges thereof whereby said sections are adapted to be closed for joining all around corresponding edges and opened for exposing said hollow interiors, and including a third section comprising an interior member, hinge means securing said third section to one of the other sections, said third section being substantially coextensive with said other sections, a mirror secured in overlying relationship with respect to one side of said third section, lights located along the peripheral edges of said mirror, and including means for seating said third section in place with respect to either of said other sections, means for latching said first and second sections together when said case is closed, and handle means for carrying said case.

2. A construction in accordance with claim 1 wherein the side wall of the case is curved inwardly whereby the side wall will conform to the body of an individual using the case, and including a shoulder strap attached to the case.

3. A construction in accordance with claim 1 wherein said lights are electrical and including a cord connected to said lights and carried with said case whereby the lights can be connected to an electrical outlet.

4. A construction in accordance with claim 3 including a switch member associated in line between said lights and said cord adapted to break the circuit between the lights and said outlet when said case is closed.

5. A construction in accordance with claim 1 including recesses defined on one side of said third section, and means for retaining articles in said recesses.

6. A construction in accordance with claim 5 wherein resilient band members extend across said recesses for retaining said articles therein.

7. A construction in accordance with claim 5 wherein a substantial space is provided in one of said first and second sections for the location of additional articles within said case.

8. A construction in accordance with claim 1 wherein said lights are electrical and including a cord connected to said lights and carried with said case whereby the lights can be connected to an electrical outlet.

9. A construction in accordance with claim 8 including a switch member associated in line with said lights and said cord adapted to break the circuit between the lights and said outlet, said switch member breaking said circuit when the case is closed and also when said third section is received in place in one of said other sections with said one side of the third section being hidden.

10. A construction in accordance with claim 9 wherein said switch is located along the bottom edge of said third section adjacent the hinge connection of said third section, a resiliently mounted actuating member for said switch, said actuating member extending outwardly from said bottom edge, said actuating member engaging a stationary surface on an opposed portion of said case with the actuating member being pressed to a circuit breaking position when so engaged, and wherein opening of the case and movement of said third section is adapted to release said actuating member to provide for completing the circuit between said lights and said outlet.

References Cited

UNITED STATES PATENTS

| 1,437,023 | 11/1922 | Schneider | 240—6.45 |
| 1,746,810 | 2/1930 | Anderson | 240—6.45 |
| 1,889,143 | 11/1932 | Hirsh | 240—6.45 |
| 2,259,154 | 10/1941 | Dame | 240—59 |
| 2,495,047 | 1/1950 | Afton et al. | 240—6.4 XR |
| 3,250,908 | 5/1966 | Lawrence et al. | 240—6.45 |
| 3,268,715 | 8/1966 | Rothman | 240—4.2 |

NORTON ANSHER, *Primary Examiner.*

JOSEPH F. PETERS, Jr., DAVID L. JACOBSON,
*Assistant Examiners.*